United States Patent [19]
Chiyoda et al.

[11] 4,323,191
[45] Apr. 6, 1982

[54] HUMIDIFYING APPARATUS FOR AN AIR-CONDITIONING EQUIPMENT

[75] Inventors: Tsuneyuki Chiyoda; Masami Ohtani, both of Higashimatsuyama, Japan

[73] Assignee: Diesel Kiki Co., Ltd., Tokyo, Japan

[21] Appl. No.: 129,677

[22] Filed: Mar. 12, 1980

[30] Foreign Application Priority Data

Mar. 13, 1979 [JP] Japan .............................. 54-31187[U]

[51] Int. Cl.³ .............................. B01F 3/02; B05B 1/08
[52] U.S. Cl. .................................. 236/44 A; 236/46 F; 239/99
[58] Field of Search ................... 236/44 B, 44 A, 46 F, 236/75; 165/20; 62/176 C; 261/DIG. 34, DIG. 74; 126/113; 239/585, 99; 307/362

[56] References Cited
U.S. PATENT DOCUMENTS 3,404,873 10/1968 Orens ................................ 98/2.11
4,042,016 8/1977 Boochever et al. .............. 62/176 C

FOREIGN PATENT DOCUMENTS 567031 8/1977 U.S.S.R. ........................... 236/44 A

Primary Examiner—William E. Wayner
Attorney, Agent, or Firm—Guy W. Shoup; Gerard F. Dunne

[57] ABSTRACT

A humidifying apparatus for equipment for conditioning the air of vehicle has a humidity detecting circuit and a humidifying device including a spray nozzle. The humidifying device is intermittently operated by a control device. Thus, humidity in the vehicle cabin can be controlled so as to be maintained at a desired value while keeping the humidity in the cabin uniform.

5 Claims, 4 Drawing Figures

HUMIDIFYING APPARATUS FOR AN AIR-CONDITIONING EQUIPMENT

This invention relates to a humidifying apparatus for equipment mounted on a vehicle to condition the air therein.

It has been considered necessary to control the humidity during conditioning the air in a car, especially when heating the air. However, since a spatial volume of the car is small and a configuration of the space is complicated, it may become highly humid in the vicinity of a humidifier and low in humidity at a position remote from the humidifier if a humidifier having a simple control system such as that typically used in a household humidifier is employed. This may cause trouble in an electrical system in the car space where a plurality of wirings for the electrical system are arranged. For this reason, an apparatus for conditioning the air in a car is often restrained from carrying out humidification. In addition, it is required to sense the humidity to control the humidifying operation. This involves such problems that a humidity is one of the most difficult physical properties to measure and that a humidity sensor is liable to be in an atmosphere containing various components other than water vapor. This is also a reason why humidification has not been carried out with much success in a car heretobefore.

It is therefore an object of the present invention to provide a humidifying apparatus for equipment conditioning air in a motor vehicle which is capable of attaining desirable humidification control.

It is another object of the present invention to provide a humidifying apparatus for such equipment which can control the humidity in the cabin so as to be maintained at desired value while keeping the humidity in the cabin uniform.

It is still another object of the present invention to provide a humidifying apparatus for such equipment which can be operated in stable condition even if the apparatus is located in a contaminated environment.

According to the present invention, a humidifying apparatus for equipment conditioning air in a vehicle has a humidity detecting circuit and a humidifying device including a spray nozzle. The humidifying device is operated intermittently by a control device on the basis of a detecting signal from the humidity detecting circuit in order that a humidity in the vehicle is maintained a given set value. Preferably, the spray nozzle is located before an evaporator of the equipment. The operation of the humidifying device is intermittently carried out during a given period of time at given time intervals. Thus, a humidity in the cabin can be controlled so as to be maintained at a desired value while keeping the humidity in the cabin uniform. Furthermore, it can be effectively prevented that only a particular portion of the cabin becomes highly humid by employing a single humidity sensor.

Other features and advantages of the present invention will be apparent from the following description taken in conjunction with the accompanying drawings in which.

The present invention will now be described in detail referring to an embodiment illustrated in the accompanying drawings.

Figure 1:
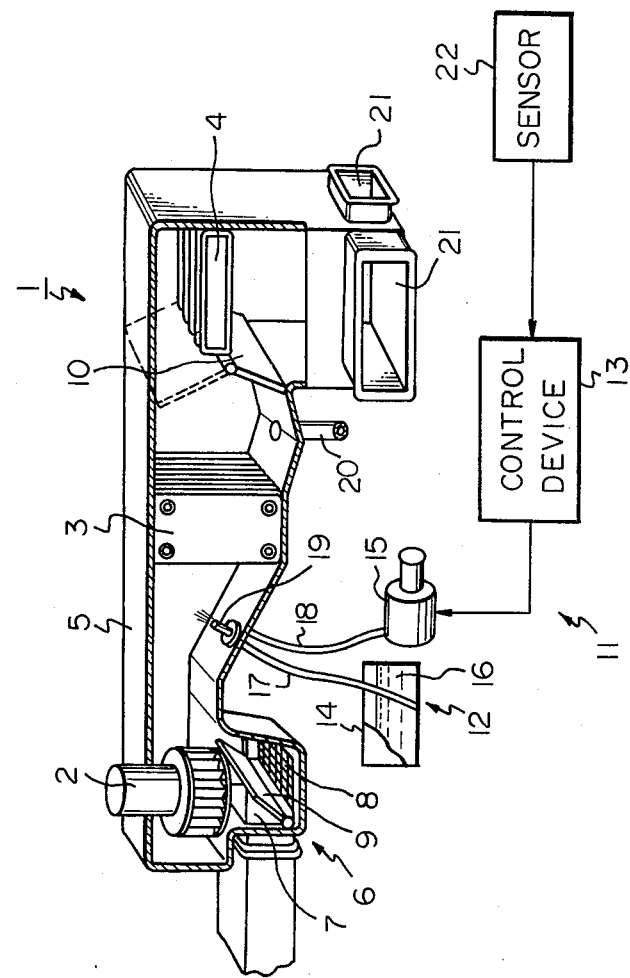
FIG. 1 illustrates a partially cutaway view in perspective of an embodiment of the present invention.

FIG. 1 illustrates one embodiment of equipment for conditioning the air of a vehicle and including therein a humidifying apparatus according to the present invention. The equipment 1 comprises a blower 2, an evaporator 3 and a heater core 4 arranged as illustrated in FIG. 1. An intake vent 6 of a duct 5 has an opening 7 communicating with the inside of the car and an opening communicating with the outside of the car. A shutter 9 is provided at the intake vent 6 to selectively close either of the openings 7 and 8. By operating the shutter 9, air in the car or air outside the car is selectively introduced into the duct 5 by the blower 2. In this connection, it is to be noted that the shutter 9 may be positioned at the position shown in FIG. 1 to take a mixture of the air in the car and the air outside the car into the duct 5. In FIG. 1, numeral 10 designates a shutter for changing a path of air flow within the duct 5 to effect changeover between heating and cooling.

The equipment 1 is provided with a humidifier 11 to control the humidity in the cabin of the car. The humidifier 11 includes a humidifying device 12 for spraying water into the duct 5 to impart moisture to the air in the duct 5 and a control device 13 for controlling the operation of the humidifying device 12 so as to keep the humidity within the cabin at a desired value. The humidifying device 12 comprises a water tank 14, an air blowing motor 15 and a spray nozzle 19 connected to a water pipe 17 for supplying the water 16 in the water tank 14, and an air pipe 18 connected to the air blowing motor 15. The spray nozzle 19 is disposed before the evaporator 3, i.e. on the windward side of the evaporator 3. In the embodiment as illustrated, the spray nozzle 19 is fixed on a wall of the duct 5 between the blower 2 and the evaporator 3 so that it can spray the water 16 in the water tank 14 into the duct 5 with air from the motor 15. In this connection, it is to be noted that since the spray nozzle 19 is located before the evaporator 3, large particles of water strike against the evaporator 3 and drain out through a drain pipe 20 and only small particles of atomized components are fed into the cabin through blow-off openings 21. This can effectively prevent waterdrops from falling onto a floor through the blow-off openings 21 of the duct 5.

A humidity sensor 22 is fixed at a suitable position in the cabin to keep the humidity in the cabin at a predetermined value. The humidity sensor 22 and the control device 13 cooperate to control the driving of the motor 15 in the on-off control mode as will be mentioned in detail below.

Figure 2:
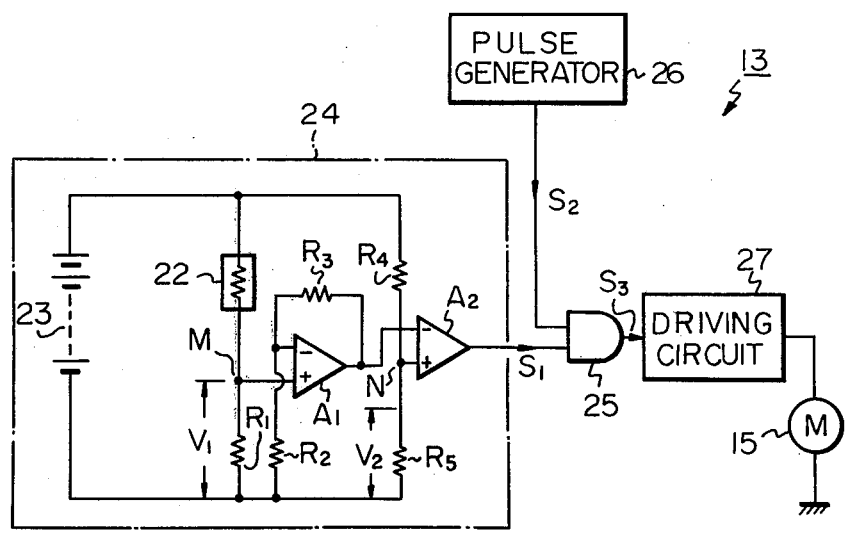
FIG. 2 illustrates a circuit diagram of an electric system of the embodiment illustrated in FIG. 1.

FIG. 2 is a circuit diagram of an electrical circuit of the humidifier 11 including the humidity sensor 22. The control device 13 includes a humidity detecting circuit 24 mainly comprised of the humidity sensor 22 and operational amplifiers $A_1$ and $A_2$ for detecting whether a humidity at a place where the humidity sensor 22 is located is higher or lower than the predetermined value. In the humidity detecting circuit 24, a series circuit of the sensor 22 and a resistor $R_1$ is connected in parallel to a d.c. power source 23. A resistance value of the sensor 22 varies depending on the humidity at the place where the sensor is disposed, so that a potential $V_1$ at a junction M of the sensor 22 and the resistor $R_1$ varies. This variation in potential is amplified by the operational amplifier $A_1$ and applied to an inverting input terminal of the operational amplifier $A_2$ functioning as a comparator. As the sensor 22, there is employed a ceramic humidity sensor utilizing a change in conductivity due to moisture adhering in pores of a ceramic of a metallic oxide. This is, this ceramic humidity sensor detects water absorbed throughout its bulk, thus making it less subject to the effect of surface contamination and more stable than the surface-layer type, and moreover with a quick response nearly equal to that of the surface-layer type.

The potential $V_1$ is raised according to a rise in relative humidity. To a non-inverting input terminal of the operational amplifier $A_2$ is applied a potential $V_2$ at a junction N of resisters $R_4$ and $R_5$, so that when the humidity at the place where the sensor 22 is disposed is low, a potential at an output of the operational amplifier $A_1$ is lower than the potential $V_2$. Accordingly, an output level of the operational amplifier $A_2$, i.e. a level of a detection signal $S_1$, is high. On the other hand, when the humidity at the place where the sensor 22 is located is high, the potential at the output of the operational amplifier $A_1$ is raised to above the potential $V_2$ and the level of the detection signal $S_1$ becomes low.

Therefore, the value of the potential $V_2$ may suitably be selected to lower the level of the detection signal $S_1$ when the humidity at the place where the sensor 22 is located is raised to a desired value. The detection signal $S_1$ is supplied to one input of an AND gate 25. Another input of the AND gate 25 receives a pulse signal $S_2$ supplied from a pulse generator 26 and having a given period and a given duty ratio. The AND gate 25 is opened only when the pulse signal $S_2$ is at a high level to pass the detection signal $S_1$ therethrough.

In the present embodiment, the pulse signal $S_2$ is a repetitive pulse signal having a period T of 30 seconds and a high-level duration of 5 seconds. Therefore, an output signal $S_3$ of the AND gate 25 remains at a low level when the level of the detection signal $S_1$ is low, while it is kept at a high level for 5 seconds every 30 seconds during the period when the level of the detection signal $S_1$ is high. The output signal $S_3$ is supplied to a driving circuit 27 for the motor as an on-off control signal so that the motor 15 is controlled to be driven only during a period when the output signal $S_3$ is at a high level.

Thus, in accordance with such an arrangement, when the humidity at the place where the sensor 22 is disposed is lowered to below the predetermined value, the level of the signal $S_1$ becomes high and the humidifying device 12 is intermittently driven according to the repetitive period and the duty ratio of the pulse signal $S_2$. Therefore, moisture is intermittently supplied on the air discharged through the blow-off openings 21, so that humidification can be effected uniformly in the cabin, preventing humidity in the vicinity of the blow-off openings from being extremely high as compared with the humidity at places remote from the blow-off openings as in the case with the conventional humidifying apparatus.

Figure 3:
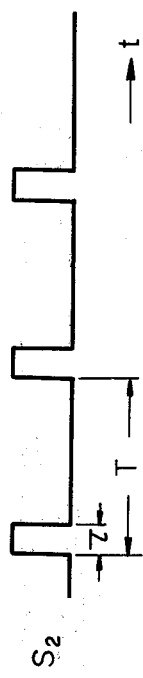
FIG. 3 illustrates a wave form of a pulse signal shown in FIG. 2.
Figure 4:
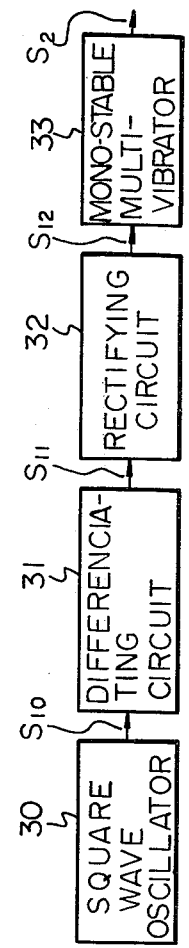
FIG. 4 illustrates a block diagram of a specific formation of a pulse generator illustrated in FIG. 2.

To obtain a pulse signal as illustrated in FIG. 3, a square wave signal $S_{10}$ having a period of 30 seconds is generated by a square wave oscillator 30 as illustrated in FIG. 4. The signal $S_{10}$ is differentiated by a differentiating circuit 31. An output signal $S_{11}$ from the differentiating circuit 31 is then rectified by a rectifying circuit 32 including a diode and a rectified differentiation signal $S_{12}$ is applied as a trigger signal to a mono-stable multivibrator 33.

In accordance with the present invention, as mentioned above, a humidity in the cabin can be controlled so as to be maintained at a desired value while keeping the humidity in the cabin uniform. Thus, it can be effectively prevented that only a particular portion of the cabin becomes highly humid even if only one humidity sensor is employed.

What is claimed is:

1. An apparatus for humidifying the air of a vehicle, comprising
   means including a humidity sensor adapted to be disposed at a given position within the vehicle for producing a detecting signal indicating the humidity at said position has attained a predetermined value;
   a humidfying device for humidifying air within said vehicle;
   a pulse generator for producing a repetitive pulse signal having a predetermined period at predetermined intervals; and
   control means receiving said detecting signal and said pulse signal for operating said humidifying device periodically in accordance with said predetermined period of said pulse signal when the humidity at said location is below said predetermined value.

2. An apparatus according to claim 1, said control means including a gate circuit receiving said detecting signal and said pulse signal for passing said detecting signal during receipt of said pulse signal.

3. An apparatus according to either of claims 1 or 2, said pulse signal being produced for approximately five seconds during each thirty second interval.

4. An apparatus according to claim 1, said humidifying device including a spray nozzle positioned before an evaporator unit of an air conditioner of said vehicle.

5. An apparatus according to any of claims 1, 2 or 4, said humidity sensor being a ceramic sensor.

* * * * *